United States Patent
Capriata et al.

(10) Patent No.: US 10,187,154 B2
(45) Date of Patent: Jan. 22, 2019

(54) ACTIVATION OF AN OPTICAL NETWORK UNIT IN A MULTI-WAVELENGTH PASSIVE OPTICAL NETWORK

(71) Applicants: POLITECNICO DI TORINO, Turin (IT); TELECOM ITALIA S.p.A., Milan (IT)

(72) Inventors: Stefano Capriata, Turin (IT); Roberto Gaudino, Turin (IT); Valter Ferrero, Turin (IT); Maurizio Valvo, Turin (IT)

(73) Assignees: TELECOM ITALIA S.p.A., Milan (IT); POLITENCNICO DI TORINO, Turin (IT)

(*) Notice: Subject to any disclaimer, the term of this patent is extended or adjusted under 35 U.S.C. 154(b) by 0 days.

(21) Appl. No.: 15/739,866

(22) PCT Filed: Jun. 30, 2015

(86) PCT No.: PCT/EP2015/064859
§ 371 (c)(1),
(2) Date: Dec. 26, 2017

(87) PCT Pub. No.: WO2017/000992
PCT Pub. Date: Jan. 5, 2017

(65) Prior Publication Data
US 2018/0183525 A1   Jun. 28, 2018

(51) Int. Cl.
*H04B 10/27* (2013.01)
*H04B 10/272* (2013.01)
(Continued)

(52) U.S. Cl.
CPC ....... *H04B 10/272* (2013.01); *H04B 10/2507* (2013.01); *H04J 14/0282* (2013.01)

(58) Field of Classification Search
CPC ............... H04B 10/272; H04B 10/2507; H04J 14/0282
(Continued)

(56) References Cited

U.S. PATENT DOCUMENTS 5,798,858 A    8/1998  Bodeep et al.
2004/0156635 A1  8/2004  Felske et al.
(Continued)

FOREIGN PATENT DOCUMENTS

| EP | 0 585 087 A1 | 3/1994 |
| EP | 0 788 252 A2 | 8/1997 |
| EP | 0 840 963 B1 | 9/2000 |

OTHER PUBLICATIONS

International Search Report dated Mar. 15, 2016 in PCT/EP2015/064859, citing documents AA, AB and AO therein, 3 pages.
(Continued)

*Primary Examiner* — Don N Vo
(74) *Attorney, Agent, or Firm* — Oblon, McClelland, Maier & Neustadt, L.L.P.

(57) ABSTRACT

It is disclosed a optical transmitter for an optical network unit of a multi-wavelength passive optical network comprising an optical line termination and a number of further optical network units for transmitting upstream signals to said optical line termination on multiple upstream channels. The optical transmitter is configured to generate and transmit an optical activation signal carrying activation information to be transmitted to said optical line termination on an upstream channel, the activation signal having an optical power lower than the optical power of each one of said upstream signals. The optical transmitter comprises an optical source, a first electric source configured to modulate the optical source with a first electric signal carrying the activation information; and a second electric source configured to directly modulate the optical source with a second electric signal so as to produce a frequency chirp on the optical activation signal.

15 Claims, 8 Drawing Sheets

(51) Int. Cl.
*H04B 10/2507* (2013.01)
*H04J 14/02* (2006.01)

(58) Field of Classification Search
USPC .......................................... 398/58
See application file for complete search history.

(56) References Cited

U.S. PATENT DOCUMENTS

| | | | |
|---|---|---|---|
| 2014/0099111 A1* | 4/2014 | Nishihara | H04B 10/073 |
| | | | 398/66 |
| 2014/0233944 A1 | 8/2014 | Vetter et al. | |
| 2015/0326321 A1* | 11/2015 | Cho | H04B 10/556 |
| | | | 398/187 |
| 2016/0043799 A1* | 2/2016 | Zheng | H04B 10/07955 |
| | | | 398/38 |
| 2016/0099775 A1* | 4/2016 | Liu | H04B 10/2507 |
| | | | 398/115 |
| 2017/0170556 A1* | 6/2017 | Carey | H01Q 3/2611 |

OTHER PUBLICATIONS

"Series G: Transmission Systems and Media, Digital Systems and Networks: Transmission media characteristics—Characteristics of optical components and subsystems: Optical interfaces for Single Channel STM-64 and other SDH systems with optical amplifiers", ITU-T G.691 Telecommunication Standardization Sector of ITU, Mar. 2006, pp. 1-43 with cover pages.

Soichi Kobayashi, et al., "Direct Frequency Modulation in AIGaAs Semiconductor Lasers", IEEE Journal of Quantum Electronics, vol.QE-18 No. 4, Apr. 1982, pp. 582-595.

* cited by examiner

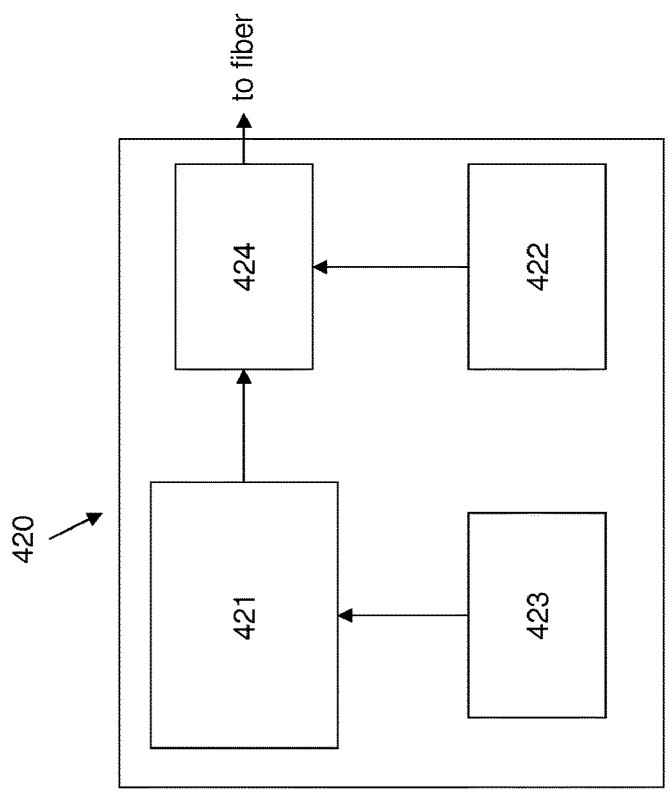
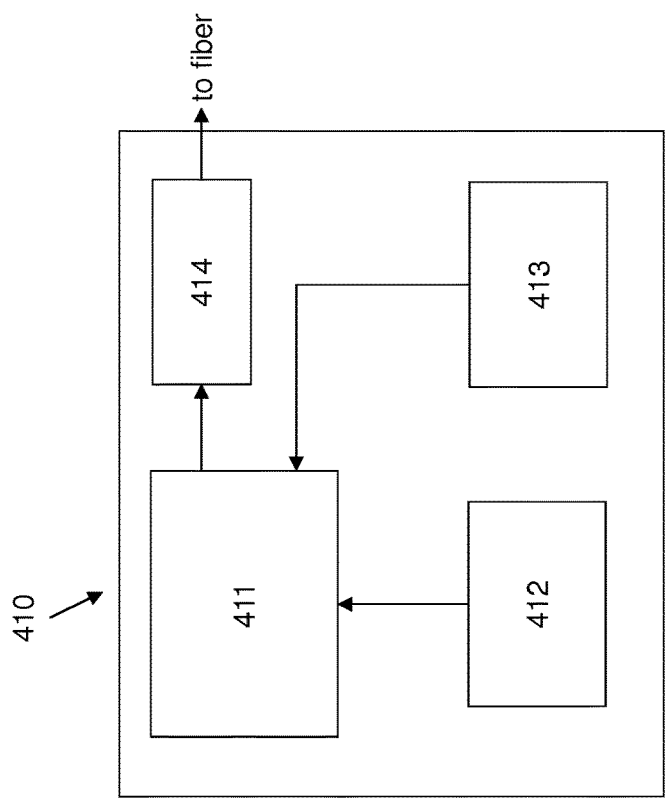
Fig. 3b
Fig. 3a

ACTIVATION OF AN OPTICAL NETWORK UNIT IN A MULTI-WAVELENGTH PASSIVE OPTICAL NETWORK

TECHNICAL FIELD

The present invention relates to the field of optical access networks. In particular, the present invention relates to a method for activating an ONU (Optical Network Unit) in a multi-wavelength PON (Passive Optical Network) and to an optical transmitter for the ONU configured to implement such method.

BACKGROUND ART

As known, optical access networks provide end users with access to several broadband services, such as for instance Internet access, video-on-demand, telephone services, etc.

Among the known optical access networks, passive optical networks (briefly termed PON) are becoming even more widespread. Typically, a PON comprises an OLT (Optical Line Termination) and an ODN (Optical Distribution Network) connected thereto. The ODN comprises optical links and optical splitters (with typical splitting ratio of 1:32 or 1:64) arranged according to a tree topology. The tree root is connected to the OLT, while each tree branch may be terminated by a respective ONU (Optical Termination Unit), to which an end user is connected.

The OLT typically transmits downstream traffic addressed to the various ONUs in the form of optical signals having a certain downstream wavelength, while the ONUs typically transmit upstream traffic addressed to the OLT in the form of optical signals having a certain upstream wavelength different from the downstream wavelength. The downstream optical signals addressed to the various ONUs are multiplexed according to the TDM (Time Division Multiplexing) technique, while the various ONUs access the ODN for transmitting the respective upstream optical signals using a TDMA (Time Division Multiple Access) technique. Hence, downstream traffic and upstream traffic basically are in the form of a sequence of downstream frames and a sequence of upstream frames, respectively. Each frame is divided in timeslots, and each timeslot carries an optical signal addressed to or transmitted by a certain ONU.

Use of TDM/TDMA allows preventing collisions between optical signals addressed to or transmitted by the various ONUs. In order to enable a proper functioning of TDM/TDMA mechanism, the ONUs of a PON shall be subjected to an activation procedure by the OLT, before they enter their normal operational state.

In particular, the ONU activation procedure as defined by the ITU-T Recommendations G.984.3 (January/2014) sec.10 (for GPON systems) and G.987.3 (January/2014) sec.12 (for XG-PON systems) basically comprises three phases. During a first phase, the ONU under activation recovers the receiving clock from the OLT and synchronizes to the downstream frames. During a second phase (also termed "discovery phase"), the ONU under activation sends to the OLT a unique identifier (e.g. its serial number) allowing the OLT to uniquely identify the ONU. During a third phase (also termed "ranging phase"), the OLT estimates the round-trip delay between itself and the ONU to be activated. This latter phase allows the OLT calculating an equalization delay to be assigned to the ONU, so as to synchronize it to the other ONUs of the PON. The second and third phases of the activation procedure are performed during a so-called "quiet window", namely a period during which transmission of upstream optical signals from the already active ONUs is temporarily suspended. In order to prevent collisions, the duration $T_{window}$ of the quiet window shall be higher than a round-trip delay, which for a typical 20 km ODN is about 200 µs. Hence $T_{window}$ is typically longer than the upstream frame period $T_{frame}$, which is equal to 125 µs for GPON and XG-PON systems.

Recently, multi-wavelength PONs (including also NG-PON, namely Next Generation PONs) have been proposed, which employ multiple wavelengths for upstream transmission (upstream channels) and multiple wavelengths for downstream transmission (downstream channels). For instance, the so-called NG-PON2 system defined by the ITU-T Recommendation G.989.1 (March/2013) may use several different downstream wavelengths (e.g. up to eight in the range 1596-1603 nm) and several different upstream wavelengths (e.g. up to eight in the range 1524-1544 nm). A multi-wavelength PON basically may be seen as the superimposition of multiple PONs operating at different upstream wavelengths and different downstream wavelengths over a same ODN. In particular, each PON of the multi-wavelength PON has a respective number of ONUs configured to exchange traffic with the OLT using a certain upstream wavelength and a certain downstream wavelength. All the PONs share the unique ODN using a WDM (Wavelength Division Multiplexing) technique.

Since, within each PON of a multi-wavelength PON, the communication between OLT and ONUs is based on the TDM/TDMA technique as described above, a proper activation procedure is required also for the ONUs of the multi-wavelength PON.

However, the activation procedures for PONs described above can not be straightforwardly applied in a multi-wavelength PON context. The ONUs indeed, especially in the NG-PON case, typically comprise tunable optical transmitters, namely optical transmitters which may be operated to emit on a continuous range or a discrete set of wavelengths. Such optical transmitters are conveniently not wavelength calibrated, meaning that the wavelength at which they start emitting as they are switched on after installation is not predictable in advance with sufficient accuracy. Lack of wavelength calibration is due to the fact that calibration performed in the factory is a quite costly process, whereas the ONUs shall have a reduced cost.

Lack of wavelength calibration however may result in collisions during the activation procedure as described above. For instance, in a NG-PON2 configured with four upstream wavelengths λu1, λu2, λu3, λu4, the activation procedure of a new ONU on e.g. the upstream channel λu2 requires providing a so called "quiet window" during which upstream transmission by all the ONUs already configured on the upstream channel λu2 is suspended, while the new ONU sends to the OLT its identifier. In the meanwhile, upstream transmission by the ONUs activated on the other upstream channels λu1, λu3, λu4 continues. Hence, if the ONU under activation (which is still uncalibrated) starts emitting on a wavelength belonging to any of channels λu1, λu3, λu4 (e.g. λu1) it disadvantageously induces a considerable crosstalk on the upstream traffic on the upstream channel λu1. This may impair the service quality for some customers and may also cause service interruptions.

In order to avoid collisions, the quiet windows on the various upstream channels of a multi-wavelength PON may be synchronized. In other words, when a new ONU shall be activated on anyone of the upstream channels, quiet windows are opened simultaneously on all the upstream channels of the multi-wavelength PON, meaning that transmission of upstream traffic is suspended for all the ONUs, independently of their transmission wavelength.

EP 0 585 087 describes a ranging method for use in TDMA systems wherein the OLT continuously superimposes either a low-level, low frequency ranging signal or a low-level, high frequency ranging signal on top of the transmitted data signal that is sent from the OLT to the ONUs.

EP 0 840 963 describes a method and device for coarse ranging in a TDMA PON system, wherein a signal with a low bitrate and with a fractional optical power compared to the main informative flow is counterpropagated compared to the main informative flow.

US 2014/233944 A1 discloses tuning an optical network unit to an appropriate communication wavelength by initiating an activation procedure responsive to receiving a wavelength configuration message, and identifying an instruction in the wavelength configuration message modify a present wavelength used by the network unit to a different wavelength. The process may also provide assigning an optical network unit identifier to the network unit, modifying the present wavelength to the different wavelength, and transmitting subsequent data messages from the network unit at the different wavelength.

SUMMARY OF THE INVENTION

The inventors have noticed that the synchronization of the quiet windows on the various upstream channels for avoiding collisions during the activation procedure, in a multi-wavelength PON, of a new ONU with a tunable, uncalibrated transmitter has some drawbacks.

In particular, this technique is disadvantageous in that it requires a centralized coordination between the various channel terminations which, at the OLT, are responsible of managing the various channels of the multi-wavelength PON. Such a centralized coordination is however not always feasible, because different channel terminations often pertain to different apparatus or different operators, who typically wish to preserve their autonomy and independence from the other operators sharing the same ODN.

In order to circumvent the need to synchronize the quiet windows on the various upstream channels, in principle out of band techniques could be used, e.g. based on low-level, low frequency signals (briefly, LL-LF signals). In particular, the ONUs might be configured or instructed by the OLT via a downstream channel to transmit—at the start of the activation procedure—only activation signals (e.g. the optical signal carrying the ONU identifier) of the LL-LF type, namely with optical power and bitrate much lower than optical power and bitrate of the pre-existing upstream traffic on the ODN transmitted by the already active ONUs. Since the optical power of the LL-LF activation signal is much lower than the optical power of the pre-existing upstream traffic, the LL-LF activation signal substantially does not affect the pre-existing upstream traffic, independently of its wavelength. Hence, no quiet window at all is required, meaning that the LL-LF activation signals may be transmitted without requiring any suspension of the upstream traffic transmission from any ONU of the multi-wavelength PON.

However, the inventors noticed that the LL-LF activation signal, while being low enough not to impair reception of the pre-existing upstream traffic, has to be high enough for being detected by the receiver at the OLT. These conditions are however not easy to be simultaneously satisfied, as it will be discussed in greater detail herein after.

As discussed above, when a new ONU with wavelength uncalibrated transmitter is switched on for the first time, the LL-LF activation signal transmitted by the new ONU has a not-predictable wavelength. During the activation procedure the new ONU will be however calibrated, namely tuned to the desired upstream channel. Assuming for instance that a single ONU is already active on the same upstream channel, the upstream optical signal emitted by this already active ONU is then subject to interferometric crosstalk by the LL-LF activation signal of the new ONU, at least at the end of the activation procedure. The interferometric crosstalk arises when the wavelength of the LL-LF activation signal is close to the wavelength of the already active ONU so that the optical beating between the two signals falls inside the bandwidth of the electric filter of the OLT receiver.

By applying known equations for the calculation of interferometric crosstalk (ITU-T Series G supplement 39—09/12, sec. 9.6.3, equation 9.31, single interferer case), it may be derived that a maximum penalty of 0.2 dB is obtained on the upstream optical signal of an already connected ONU when the received optical power of the LL-LF activation signal of the activating ONU is at least 41 dB below the power of the received optical signal (under the assumption of upstream bitrate of 2.5 Gbps, OOK transmission with extinction ratio of 8.2 dB, optical receiver based on PIN technology and average power decision threshold).

On the other hand, as already mentioned above, the received optical power of the LL-LF activation signal of the activating ONU should be high enough to be detected by the OLT receiver For instance, the received optical power of the LL-LF activation signal of the activating ONU should be at most 26 dB below the power of the signal received from an already active ONU to achieve a LL-LF activation signal data rate of 1 kbps at a bit error rate (BER) of $10^{-4}$ (under the assumption of upstream bitrate of 2.5 Gbps). However, increasing the power level of the LL-LF activation signal generates an increase of the interferometric crosstalk over the upstream optical signals emitted by the already active ONU (according to the example described above, the induced penalty would be equal to about 1.3 dB) causing an unacceptable deterioration of the signal quality.

As apparent from the above, the two requirements related to the optical power of the LL-LF activation signal (namely, the power of the LL-LF activation signal has to be high enough to be detected by the OLT receiver while being low enough in order to minimize the impact on the upstream optical signals of already active ONUs) can be very hardly met together.

In view of the above, the Applicant has tackled the problem of providing a method for activating an ONU with a tunable, uncalibrated transmitter in a multi-wavelength PON which allows to overcome the aforesaid drawbacks. In particular, the Applicant has tackled the problem of providing a method for activating an ONU with a tunable, uncalibrated transmitter in a multi-wavelength PON which allows generating an LL-LF activation signal which causes a reduced interferometric crosstalk on the upstream optical signals of already active ONUs. This may allow to increase the power level of the LL-LF activation signal without inducing excessive penalties on the upstream signals of the active ONUs.

In the present description, the expression "uncalibrated tunable transmitter" will designate an optical transmitter (e.g. a laser) tunable on either a continuous range or a discrete set of wavelengths, which—upon its switching on—starts emitting on a non predictable wavelength amongst those on which it may be tuned.

Further, in the present description and in the claims, the expression "activating an ONU on an upstream channel of a multi-wavelength PON" will designate an operation carried out by the OLT which is propaedeutic to normal operation of the ONU, and which comprises recognizing the ONU and—if the ONU's transmitter is an uncalibrated tunable transmitter—tuning the transmission wavelength of its uncalibrated transmitter on a wavelength lying within a predefined upstream channel of those supported by the multi-wavelength PON. The OLT identifies the upstream channel upon which the ONU shall be activated after it recognizes the ONU.

According to a first aspect, the present invention provides an optical transmitter for an optical network unit of a multi-wavelength passive optical network comprising an optical line termination and a number of further optical network units for transmitting upstream signals to said optical line termination on multiple upstream channels, the optical transmitter being configured to generate and transmit an optical activation signal carrying activation information to be transmitted from the optical network unit to the optical line termination on an upstream channel of said multiple upstream channels, the activation signal having an optical power lower than the optical power of each one of the upstream signals, the optical transmitter comprising an optical source and:
 a first electric source configured to modulate the optical source with a first electric signal carrying the activation information; and
 a second electric source configured to directly modulate the optical source with a second electric signal so as to produce a frequency chirp on the optical activation signal.

Preferably, the activation signal has a bitrate lower than a bitrate of each one of said upstream signals transmitted by the further optical network units on the multiple upstream channels.

According to a first embodiment of the present invention, the first electric source is configured to directly modulate the optical source.

Preferably, the optical transmitter further comprises an optical attenuator configured to provide at the output of the optical transmitter the activation signal with the optical power lower than the optical power of each one of the upstream signals.

According to a second embodiment of the present invention, the optical transmitter further comprises an optical modulator downstream the optical source and the first electric source is configured to externally modulate the optical source by feeding the first electric signal to the optical modulator.

Preferably, the first electric signal is a sinusoidal signal modulated by the activation information according to a binary phase shift keying modulation scheme.

Preferably, the first electric signal is a sinusoidal signal modulated by the activation information having a carrier frequency equal to 2.5 MHz.

Preferably, the second electric signal is one of a sinusoidal wave signal, a triangular wave signal or a sawtooth wave signal.

Preferably, the second electric signal has a frequency ranging between about 100 Hz and about 10 KHz.

According to a second aspect, the present invention provides an optical network unit for a multi-wavelength passive optical network comprising an optical line termination and a number of further optical network units for transmitting upstream signals to the optical line termination on multiple upstream channels, the optical network unit comprising an optical transmitter configured to generate and transmit an optical activation signal carrying activation information to be transmitted from the optical network unit to the optical line termination on an upstream channel of the multiple upstream channels, the activation signal having an optical power lower than the optical power of each one of the upstream signals, the optical transmitter comprising an optical source and:
 a first electric source configured to modulate the optical source with a first electric signal carrying the activation information; and
 a second electric source configured to directly modulate the optical source with a second electric signal so as to produce a frequency chirp on the optical activation signal.

According to a third aspect, the present invention provides a multi-wavelength passive optical network comprising:
 an optical line termination;
 an optical network unit to be activated on an upstream channel of the multi-wavelength passive optical network; and
 a number of further optical network units configured to transmit upstream signals to the optical line termination on multiple upstream channels including the upstream channel,
wherein the optical network unit comprises an optical transmitter configured to generate and transmit an optical activation signal carrying activation information to be transmitted from the optical network unit to the optical line termination on an upstream channel of the multiple upstream channels, the activation signal having an optical power lower than the optical power of each one of the upstream signals, the optical transmitter comprising an optical source and:
 a first electric source configured to modulate the optical source with a first electric signal carrying the activation information; and
 a second electric source configured to directly modulate the optical source with a second electric signal so as to produce a frequency chirp on the optical activation signal.

According to a fourth aspect, the present invention provides a method for activating an optical network unit on an upstream channel of a multi-wavelength passive optical network, the multi-wavelength passive optical network comprising an optical line termination and a number of further optical network units for transmitting upstream signals the optical line termination on multiple upstream channels including the upstream channel, the method comprising generating an optical activation signal carrying activation information to be transmitted from the optical network unit to the optical line termination on an upstream channel of the multiple upstream channels, the activation signal having an optical power lower than the optical power of each one of the upstream signals, generating an optical activation signal comprising:
a) modulating an optical source with a first electric signal carrying the activation information;
b) directly modulating the optical source with a second electric signal so as to produce a frequency chirp on the optical activation signal; and
c) transmitting the optical activation signal to the optical line termination.

Preferably, at step a), modulating comprises directly modulating the optical source or externally modulating the optical source by feeding the first electric signal to an optical modulator downstream the optical source.

Preferably, the method further comprises detecting the activation signal at the optical line termination if the activation signal is transmitted on the upstream channel and sending a feedback signal from the optical line termination to the optical network unit.

Preferably, step c) comprises transmitting the activation signal in a substantially continuous way until a predefined time has expired or until the feedback signal is received at the optical network unit.

BRIEF DESCRIPTION OF THE DRAWINGS

The present invention will become clearer from the following detailed description, given by way of example and not of limitation, to be read with reference to the accompanying drawings, wherein:

FIGS. 3a and 3b are, respectively, block schemes of an optical transmitter for the ONU of the multi-wavelength PON network according to a first embodiment and a second embodiment of the present invention;

DETAILED DESCRIPTION OF PREFERRED EMBODIMENTS OF THE INVENTION

Figure 1:
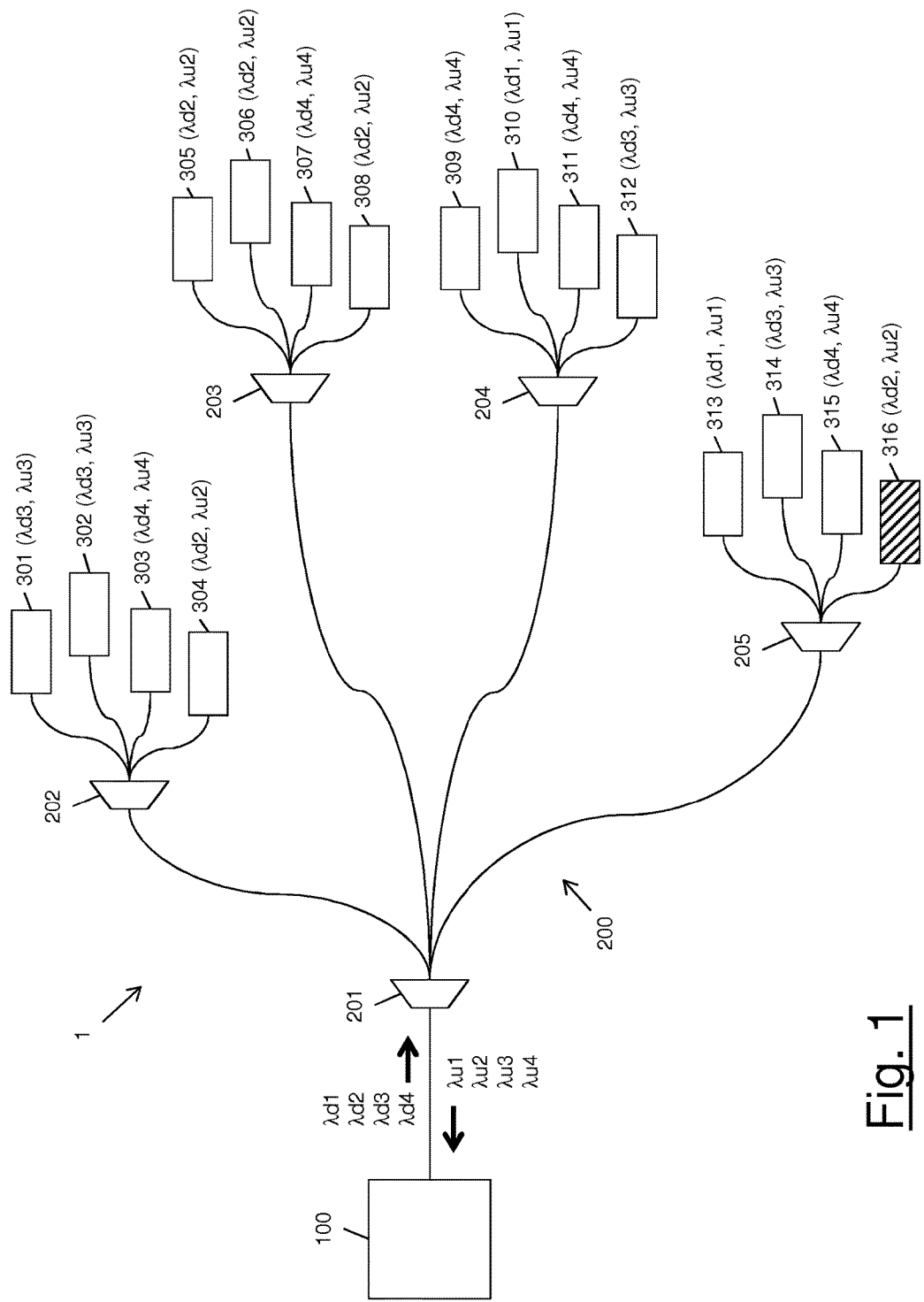
FIG. 1 schematically shows an exemplary multi-wavelength PON network.

FIG. 1 schematically shows an exemplary multi-wavelength PON (Passive Optical Network).

The multi-wavelength PON 1 comprises an OLT 100, a ODN (Optical Distribution Network) 200 and a plurality of ONUs (Optical Network Units) 301-316. The ODN 200 preferably comprises at least one optical splitter and optical fibres arranged according to a tree topology. The root of the ODN 200 is connected to the OLT 100, while each branch of the ODN 200 is preferably terminated by a respective ONU 301-316. More particularly, the ODN 200 shown in FIG. 1 comprises (by way of non limiting example) five optical splitters 201, 202, 203, 204, 205 with splitting ratio of 1:4, arranged according to a tree topology with sixteen branches.

The multi-wavelength PON 1 preferably employs multiple downstream wavelengths (or downstream channels) for transmission from the OLT 100 to the ONUs 301-316, and multiple upstream wavelengths (or upstream channels) for transmission from the ONUs 301-316 to the OLT 100. By way of non-limiting example, it is assumed that the multi-wavelength PON 1 uses four downstream wavelengths $\lambda d1$, $\lambda d2$, $\lambda d3$, $\lambda d4$ in the range 1596-1603 nm and four upstream wavelengths $\lambda u1$, $\lambda u2$, $\lambda u3$, $\lambda u4$ in the range 1524-1544 nm.

For instance, by way of non limiting example, in the following description it is also assumed that:

the ONUs 310, 313 are configured to exchange traffic with the OLT using the wavelengths $\lambda d1$, $\lambda u1$;

the ONUs 304, 305, 306, 308, 316 are configured to exchange traffic with the OLT using the wavelengths $\lambda d2$, $\lambda u2$;

the ONUs 301, 302, 312, 314 are configured to exchange traffic with the OLT using the wavelengths $\lambda d3$, $\lambda u3$; and the ONUs 303, 307, 309, 311, 315 are configured to exchange traffic with the OLT using the wavelengths $\lambda d4$, $\lambda u4$.

Hence, the ONUs 301-316 are basically split into four different groups, each group being configured to exchange user traffic with a respective channel termination of the OLT 100 using a respective upstream wavelength and a respective downstream wavelength. Within each group, the ONUs and the respective channel termination of the OLT 100 exchange user traffic using known TDM/TDMA techniques, while user traffic at different wavelengths (i.e. user traffic addressed to or coming from ONUs of different groups) is multiplexed on the ODN 200 using a known WDM technique. The OLT 100 therefore comprises four different channel terminations (not shown in FIG. 1), which may be either autonomous (meaning that each channel termination autonomously manages the respective upstream channel and downstream channel) or under the control of a central manager of the OLT 100 (meaning that a centralized coordination of the various channel terminations—and hence of the management of the various upstream channels and downstream channels—is provided). According to embodiments not shown in the drawings, the PON 1 may comprise multiple, physically separated OLTs amongst which the various channel terminations are distributed.

Herein after, it is assumed that at least one of the ONUs 301-316 of the multi-wavelength PON 1 still has to be activated on its upstream and downstream channels, namely it is connected to the ODN 200 but has not entered its normal operational state yet (namely, it is not exchanging user traffic with the OLT 100 using the intended upstream wavelength and downstream wavelength yet).

By way of non limiting example, it is assumed that the ONU 316 (indicated by hatching in FIG. 1) still has to be activated on the upstream channel $\lambda u2$ and downstream channel $\lambda d2$. Besides, the ONUs 304, 305, 306, 308 are already active on those channels and are accordingly exchanging user traffic with the OLT 100 using the upstream wavelength $\lambda u2$ and the downstream wavelength $\lambda d2$. In particular, with reference to the upstream direction, the ONUs 304, 305, 306, 308 are sending to the OLT 100 respective upstream signals at the upstream wavelength $\lambda u2$, using a TDMA (Time Division Multiple Access) technique.

It is also assumed that the other ONUs shown in FIG. 1 are already active on the respective channels, and are accordingly exchanging user traffic with the OLT 100 using the respective upstream wavelength (any of $\lambda u1$, $\lambda u3$, $\lambda u4$) and downstream wavelength (any of $\lambda d1$, $\lambda d3$, $\lambda d4$).

With reference now to the flow chart of FIG. 2, the method for activating the ONU 316 according to embodiments of the present invention will be described in detail. It is to be noticed that the activation procedure represented by the flowchart of FIG. 2 may be performed after installation of the ONU 316 in order to activate it on its upstream and downstream channels $\lambda u2$, $\lambda d2$, as mentioned above. The same procedure should be repeated in order to activate the ONU 316 on any other pair of upstream and downstream channels.

Hence, according to an exemplary situation, the activation procedure may be performed once after installation, for activating the ONU on a given channel, as it will be exemplarily described herein after. The same procedure shall be repeated for activating the ONU on another channel, when needed. According to another example, the activation procedure may be repeated a number of times at the installation of the ONU for activating it sequentially on all the available channels.

According to the present invention, the ONU 316 to be activated comprises a tunable, uncalibrated optical transmitter (namely an optical transmitter which may be operated to emit on a continuous range or a discrete set of wavelengths, the actual wavelength at which it starts emitting as it is switched on being however unpredictable) which, as the ONU 316 to be activated is connected to the ODN 200, generates an optical activation signal AS (in the following indicated simply as "activation signal AS") to be transmitted to the OLT 100 via the ODN 200 (step 201), as it will be described herein after. According to an embodiment of the present invention, before transmitting the activation signal AS, recovers the receiving clock from the OLT 100, synchronizes to the downstream frames and waits until an activation signal transmit grant is received from the OLT (step 201).

The activation signal AS is preferably a low level, low frequency signal, namely it has optical power $P_C$ and bitrate $R_C$ lower than optical power $P_D$ and bitrate $R_D$ of each one of the upstream signals that the already active ONUs 301-315 are transmitting to the OLT 100.

In particular, the optical power $P_C$ of the activation signal AS at the receiver of the OLT 100 is preferably lower than the sensitivity of the receiver of the OLT 100 (namely, the minimum power detectable by the receiver of the OLT 100) at the data upstream bitrate (namely, the bitrate of the upstream signals transmitted by the already active ONUs 301-315). For instance, the optical power $P_C$ of the activation signal AS at the receiver of the OLT 100 may be between 28 dB and 50 dB below the sensitivity of the receiver of the OLT 100 at the data upstream bitrate. Moreover, the optical power $P_C$ of the activation signal AS may be selected so as to induce a given maximum penalty (e.g. of 0.2 dB) on each one of the upstream signals that the already active ONUs 301-315 are transmitting to the OLT 100. For instance, as discussed above, the optical power $P_C$ of the activation signal AS at the receiver of the OLT 100 may be 41 dB below the sensitivity of the receiver at the OLT 100.

Besides, the bitrate $R_C$ of the activation signal AS is selected so as to enable a sufficiently fast activation of the ONU. For example, if the identification message (namely, the message containing a unique identifier of the ONU 316) is 48-byte long, a rate of 100 bit/s for the activation signal AS would require at least about 4 seconds for the ONU to be discovered. This time could become larger when multiple attempts are required until the discovery process completes successfully. Further details on the bitrate $R_C$ of the activation signal AS will be given herein after. The bitrate $R_D$ of the upstream signals transmitted by the active ONUs is typically 2.5 Gbit/s or 10 Gbit/s.

The wavelength of the activation signal AS may be any one of the wavelengths at which the optical transmitter of the ONU 316 may be tuned. Hence, though the ONU 316 shall be activated on the nominal upstream channel λu2, the wavelength of the activation signal AS is not necessarily λu2. The tuning of the ONU 316 at the desired upstream wavelength λu2 will be operated subsequently by the OLT 100.

Besides, the phase of the activation signal AS is preferably synchronized to the downstream frames transmitted by the OLT 100 on the downstream channel λd2 on which the ONU 316 shall be activated. This advantageously eases the reception of the activation signal AS at the OLT 100.

The activation signal AS preferably carries activation information which the ONU 316 to be activated shall communicate to the OLT 100. Preferably, the activation signal AS carries a unique identifier of the ONU 316, allowing the OLT 100 to uniquely identify the ONU 316 and to retrieve its activation parameters (e.g. its wavelength tuning parameters). Additionally, the activation signal AS may comprise other information, such as for instance status information or control information. This information may comprise, for instance, an indication about the channels on which the ONU 316 has been already activated, if any.

Figure 4:
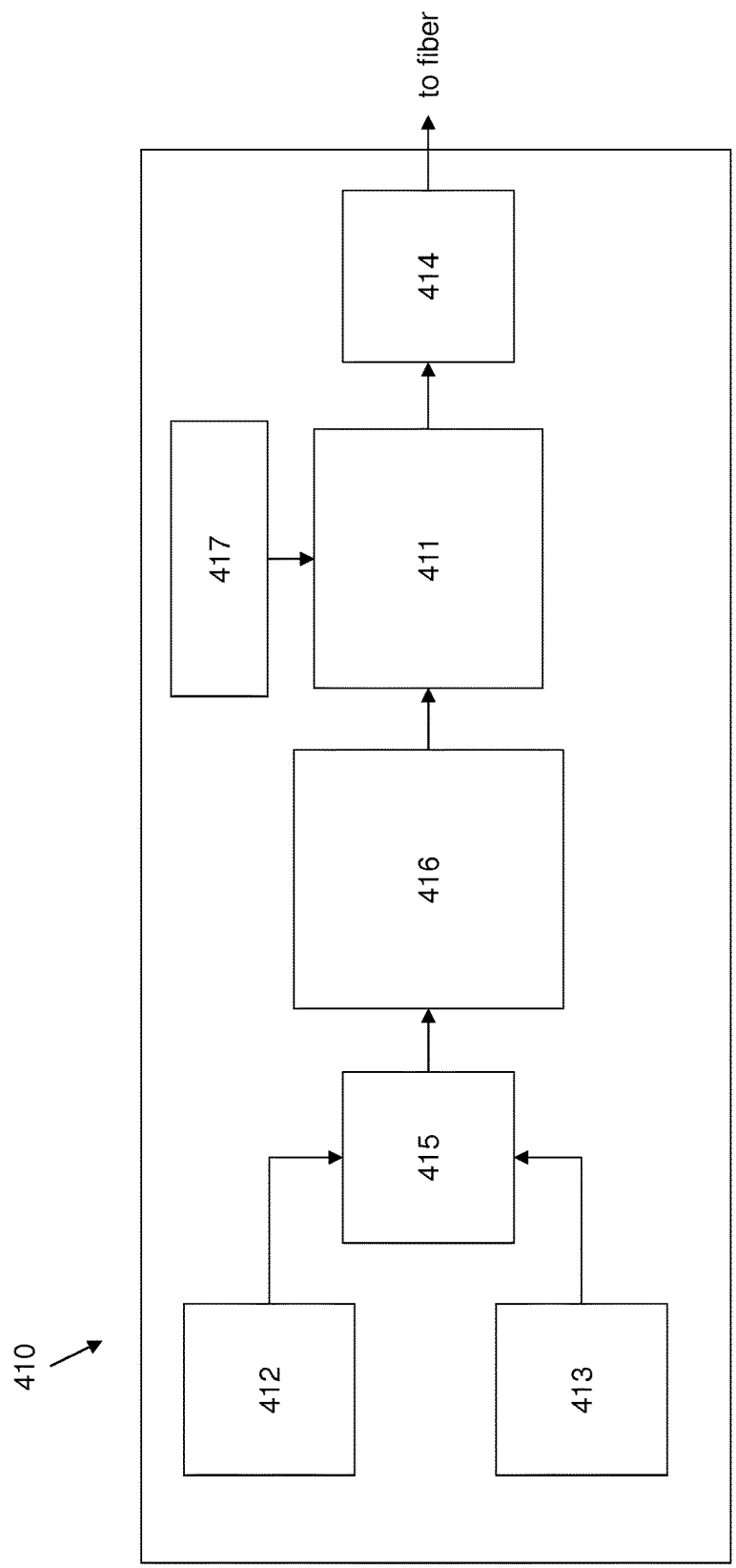
FIG. 4 is a more detailed block scheme of an optical transmitter for the ONU of the multi-wavelength PON network according to the first embodiment of the present invention.

At step 202, the ONU 316 preferably generates the activation signal AS and transmits it to the OLT 100. In the following, this step will be described in detail with reference to FIGS. 3a, 3b and 4 representing block schemes of an optical transmitter of the ONU 316 according to different embodiments of the present invention.

In particular, FIG. 3a shows a block scheme of an optical transmitter 410 of the ONU 316, which is configured to generate the activation signal AS according to a first embodiment of the present invention. The optical transmitter 410 according to this first embodiment preferably comprises an optical source 411, a first electric source 412, a second electric source 413, and an optical attenuator 414. The first electric source 412 and the second electric source 413 are both connected to an electric input of the optical source 411. Further components may be interposed between the first electric source 412 and the second electric source 413 and the electric input of the optical source 411, as it will be described herein after. The output of the optical source 411 is connected to the input of the optical attenuator 414, whose output corresponds to the output of the optical transmitter 410. The first electrical source and the second electrical source may be implemented as separate electrical sources or they may share the same circuitry FIG. 3b shows a block scheme of an optical transmitter 420 of the ONU 316, which is configured to generate the activation signal AS according to a second embodiment of the present invention. The optical transmitter 420 according to this second embodiment preferably comprises an optical source 421, a first electric source 422, a second electric source 423, and an optical modulator 424. The first electric source 422 is connected to the optical modulator 424, while the second electric source 423 is connected to the optical source 421. The optical source 422 is connected to the optical modulator 424, whose output corresponds to the output of the optical transmitter 420.

In both the first and second embodiments, the optical source 411, 421 is preferably a laser diode, more preferably a DFB (Distributed Feedback) laser diode.

According to the first embodiment of the optical transmitter of the present invention, for the generation of the activation signal AS, the optical source 411 of the optical transmitter 410 is directly modulated by a first electric signal generated by the first electric source 412. The first electric signal is preferably in the form of a driving current for the optical source 411. The first electric signal preferably carries the activation information. In particular, the first electric signal is preferably a sinusoidal signal modulated by the low rate activation information. For example, the first electric signal may be modulated by the activation information according to a binary phase shift keying (BPSK) modulation scheme. In the following description, the first electric signal will also be referred to as "modulated (electric) signal". The carrier frequency of the modulated signal is preferably equal to few MHz, for instance 2.5 MHz. Preferably, the modulated signal is suitable to drive the optical source so as to produce an optical signal at the output of the transmitter 410 (namely, the activation signal AS) having a bitrate $R_C$ lower than the bitrate $R_D$ of each one of the upstream signals that the already active ONUs 301-315 are transmitting to the OLT 100. The inventors found that the bitrate $R_C$ of the activation signal AS at the output of the optical transmitter 410 can be computed according to the following formula:

$$R_C = \frac{m^2}{4}\left(\frac{P_C}{P_D}\right)^2 \frac{R_D}{\left(\frac{E_b}{N_0}\right)_C} \left(\frac{r+1}{r-1}\right)^2 \text{ [bit/s]} \quad [1]$$

where m is the modulation depth of the activation signal AS, $P_C$ and $P_D$ are, respectively, the power of the activation signal AS and the power of the upstream data signal at the OLT receiver, r is the extinction ratio of the upstream data signal and $E_b/N_0$ is the energy per bit to noise spectral density ratio required for a reliable detection of the activation signal at the OLT. For example, if a penalty of 1 dB is accepted, by applying the equation 9.31 of the ITU-T Series G supplement 39—09/12, sec. 9.6.3, single interferer case, it may be derived that $P_C/P_D$-27.8 dB; then, assuming m=0.9, $R_D$=2.5 Gbit/s, $E_b/N_0$=13.9 dB, BER=$10^{-4}$, r=8.2 dB, a rate $R_C$ of the activation signal AS equal to about 100 bit/s can be achieved.

Moreover, the optical attenuator 414 is configured to provide an optical signal at the output of the transmitter 410 (namely, the activation signal AS) having optical power $P_C$ lower than optical power $P_D$ of each one of the upstream signals that the already active ONUs 301-315 are transmitting to the OLT 100. For example, provided that the transmission power of the ONU may range between 0 dBm and 9 dBm, depending on the bitrate $R_D$, during transmission of the activation signal AS, the optical attenuator 414 may introduce an attenuation of about 61 dB, if a maximum differential optical power of 20 dB is assumed at the OLT receiver (which results from the sum of differential losses induced among different branches of the PON 1, which may be up to 15 dB, and a tolerance to which the output power of ONU's transmitters is subjected, which may be of about 5 dB) and assuming a maximum tolerated crosstalk of −41 dB.

Furthermore, the optical source 411 of the optical transmitter 410 is directly modulated by a second electric signal generated by the second electric source 413. Also the second electric signal is preferably in the form of a driving current for the optical source 411. Preferably, the second electric signal is a sinusoidal signal, however other waveforms may also be used, as it will be disclosed herein after. In the following description, the second electric signal will also be referred to as "dithering (electric) signal". Preferably, the frequency of the dithering signal ranges between about 100 Hz and about 10 kHz.

FIG. 4 shows a more detailed block scheme of the optical transmitter 410 according to the first embodiment of the present invention. As already mentioned above, the optical source 411 is preferably a laser diode. According to this scheme, the first electric source 412 and the second electric source 413 are connected to a coupler 415 which is in turn connected to an impedance adapter 416. The coupler 415 has the function to mix the electric signals generated by the first electrical source 412 and by the second electrical source 413 in order to create a drive signal for the optical source 411. The impedance adapter 415 acts as an electric interface to perform an impedance adjustment between the coupler 415 and the electric input of the optical source 411.

The output of the impedance adapter 416 drives the laser diode 411, which is also connected to a bias current controller 417. The bias current controller 417 is preferably configured to control the bias current of the laser diode 411.

The operation of the coupler 415, the impedance adapter 416 and the bias current controller 417 is known to a person skilled in the art and hence will not be described in greater detail herein after.

According to the second embodiment of the present invention, for the generation of the activation signal AS, the optical source 421 of the optical transmitter 420 is externally modulated by a first electric signal generated by the first electric source 422 and fed to the optical modulator 424. The first electric signal is preferably in the form of a driving current or voltage for the optical modulator 424. The first electric signal preferably carries the activation information. In particular, the first electric signal is preferably a sinusoidal signal modulated by the low rate activation information. For example, the first electric signal may be modulated by the activation information according to a binary phase shift keying (BPSK) modulation scheme. In the following description, the first electric signal will also be referred to as "modulated (electric) signal". The carrier frequency of the modulated electric signal is preferably equal to few MHz, for instance 2.5 MHz. Preferably, the modulated signal is suitable to drive the optical modulator 424, which on its turn modulates the optical signal generated by the optical source 421 so as to produce an optical signal (namely, the activation signal AS) having optical power $P_C$ and bitrate $R_C$ lower than optical power $P_D$ and bitrate $R_D$ of each one of the upstream signals that the already active ONUs 301-315 are transmitting to the OLT 100.

Furthermore, the optical source 421 of the optical transmitter 420 is directly modulated by a second electric signal generated by the second electric source 423. Also the second electric signal is preferably in the form of a driving current for the optical source 421. Preferably, the second electric signal is a sinusoidal wave. However, as it will be described in greater detail herein after, the second electric signal may alternatively be a triangular wave signal or a sawtooth wave signal. In the following description, the second electric signal will also be referred to as "dithering (electric) signal". Preferably, the frequency of the dithering signal ranges between about 100 Hz and about 10 kHz.

It is to be noticed that the optical transmitter 410, 420 according to the embodiments of the present invention may comprise other blocks and components not illustrated in FIGS. 3a, 3b and 4, which are not relevant to the present description.

At step 202, the optical transmitter 410, 420 of the ONU 316 preferably transmits to the OLT 100 the optical activation signal AS.

As described above, according to both the first embodiment and the second embodiment of the present invention, the optical source 411, 421 of the optical transmitter 410, 420 is (respectively, directly or externally) modulated by a low frequency signal (namely, the modulated electric signal)

and further directly modulated by another low frequency signal (namely, the dithering electric signal, whose frequency ranges between about 100 Hz and about 10 kHz). The optical transmitter 410, 420 outputs a low level, low frequency activation signal AS which is affected by the known phenomenon of the frequency chirping (or, equivalently, frequency chirp). Frequency chirping, as referred to an optical source, indicates a phase and/or frequency modulation (or, equivalently, a wavelength modulation) of the signal output by the source. The frequency chirping of an optical source is described by the chirp parameter α, as defined in paragraph 6.2.1.3 of ITU-T G.691 (March/2006) Recommendation "Optical interfaces for single channel STM-64 and other SDH systems with optical amplifiers".

Indeed, the variation of the current at the input of the optical source 411, 421 driven by the (low frequency) dithering electric signal generates a spurious modulation of frequency and phase of the generated optical signal, in addition to the wanted modulation of the activation signal AS generated by the (low frequency) modulated electric signal. According to the first embodiment of the present invention, this spurious modulation is superimposed to a spurious modulation caused by the low frequency modulated electric signal, which directly modulates the optical source 411, so that the chirping effect is maximized. Differently, in the optical transmitter according to the second embodiment of the present invention, the low frequency modulated electric signal, which externally modulates the optical source 421, causes a negligible spurious modulation. Hence, the chirping effect, in this latter case, is substantially caused by the low frequency dithering electric signal directly modulating the optical source 421. In any case, the spurious modulation caused by the low frequency dithering electric signal causes a dithering of the spectrum of the activation signal AS. In particular, as known, the central frequency (or wavelength) of the spectrum of the activation signal AS is subject to instantaneous changes and the spectrum appears as broadened if averaged over time.

Figure 5A:
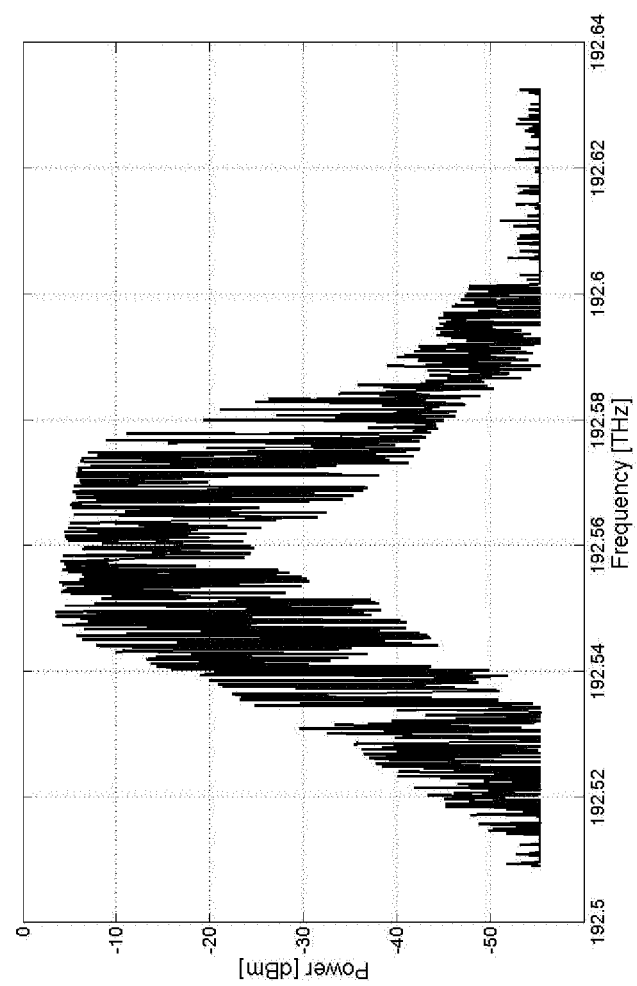
FIGS. 5a and 5b show two spectra of an activation signal generated by the optical transmitter according to embodiments of the present invention.
Figure 5B:
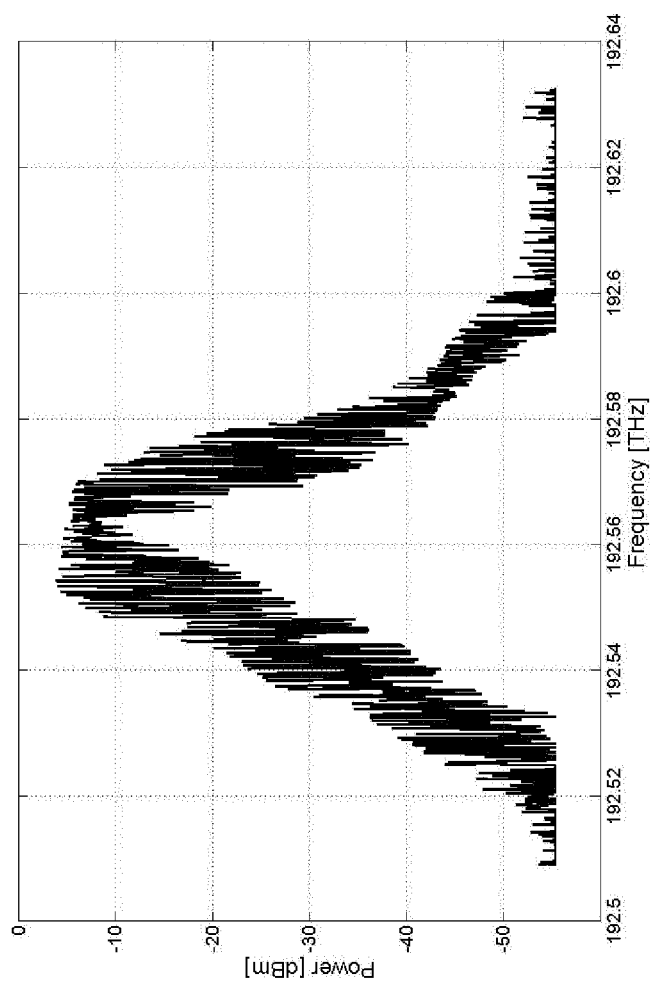

FIGS. 5a and 5b show two spectra of the activation signal AS generated by an optical transmitter 410 according to the first embodiment of the present invention. In particular, FIG. 5a shows the spectrum of the activation signal AS when the modulated electric signal is a low frequency signal with carrier frequency 2.5 MHz and the dithering electric signal is a low frequency signal with frequency 100 Hz. FIG. 5b shows the spectrum of the activation signal AS when the modulated electric signal is a low frequency signal with carrier frequency 2.5 MHz and the dithering electric signal is a low frequency signal with frequency 1 kHz. In both cases, the low frequency modulated electric signal and the low frequency dithering electric signal contribute, respectively, with 70% and 30% to the total modulation of the optical carrier.

Figure 5C:
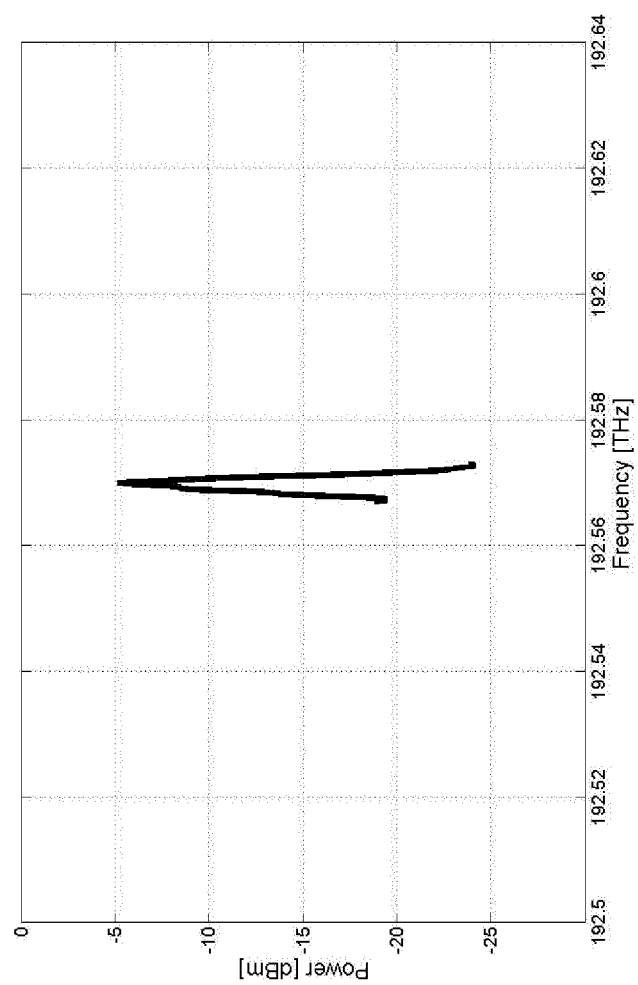
FIG. 5c shows the spectrum of a signal generated by the optical transmitter when in normal operating conditions.

FIG. 5c shows the spectrum of the activation signal AS when no dithering electric signal is applied.

As can be seen from a comparison of FIGS. 5a and 5b with FIG. 5c the effect of a direct modulation of an optical source (first embodiment) with a low frequency signal (namely, the dithering signal) is to dither the frequency of the source in a large bandwidth. For example, as can be seen from FIG. 5b, when a low frequency dithering electric signal at 1 kHz is used, the −3 dB spectral width of the activation signal AS (being the optical spectrum acquired over about 100 cycles of the 1 kHz signal) is equal to about 21 GHz. As can be seen from FIG. 5a, the −3 dB spectral width of the activation signal AS is equal to about 29 GHz when the frequency of the dithering electric signal is equal to 100 Hz.

Thanks to the effect described above, the beating between the activation signal AS of the ONU 316 and any upstream signal of already active ONUs falls inside the bandwidth of the electric filter of the OLT receiver, which is typically equal to 0.7-0.8 times the rate of the data signal, only for a small fraction of the time of transmission of the activation signal AS. This advantageously results in reducing the period of time in which the interferometric crosstalk between the activation signal AS and the signal transmitted by an already active ONU arises during the activation of the ONU 316, and hence in reducing the average crosstalk.

Indeed, when the low frequency modulated electric signal directly modulates the optical source, according to the first embodiment of the present invention, the chirping effect already affecting the frequency and phase of the optical source is further enhanced by adding the low frequency dithering signal directly modulating the optical source. In this case, the interferometric crosstalk may be instantaneously high (when the wavelength of the activation signal of the ONU to be activated is very close to the wavelength of an upstream signal of an already active ONU) but, in the average, due to the instantaneous variation of the central wavelength of the activation signal spectrum, the interferometric crosstalk is reduced with respect to the case in which no low frequency dithering signal is added to the low frequency modulated signal.

When the external modulation is used, according to the second embodiment of the present invention, this modulation, as known, is not sufficient to mitigate the interferometric crosstalk as the chirping effect, caused by the low frequency modulated signal, is negligible. In this case, directly modulating the optical source with the low frequency dithering signal advantageously provides the chirping effect which produces the instantaneous variation of the central wavelength of the activation signal spectrum and, consequently, the reduction of the interferometric crosstalk.

It is to be noticed that the frequency of the dithering signal directly modulating the optical source according to the present invention, is chosen so as to maximize the chirping effect. Indeed, as known from Kobayashi S, et al: "Direct Frequency Modulation In AlGaAs Semiconductor Lasers", IEEE Journal of Quantum Electronics, vol. 18, no. 4, pp. 582-595, a maximum instantaneous deviation of the frequency of a laser can be observed as due to the so called "thermal effect" in the low modulation frequency region. This deviation can be higher than 1 GHz/mA for modulation frequencies within the range 100 Hz-10 kHz. For a variation in the modulation current of 10 mA, a frequency deviation greater than 10 GHz can be obtained. Such a frequency deviation moves the spectrum of the activation signal AS (FIGS. 5a and 5b) outside the bandwidth of the filter of the OLT receiver (for the case of a 2.5 GHz upstream transmission) for most of the time of transmission of the activation signal AS. The advantage in crosstalk performance can be estimated in terms of the BER induced on the upstream signal of the already active ONU. The BER is reduced by an amount which is proportional, in percentage, to the amount of time during which the spectrum of the activation signal AS is outside of the bandwidth of the electric filter of the OLT receiver. For example, if the dithering causes the spectrum to move outside of the electric filter bandwidth of the OLT receiver for 90% of the time, then BER will be reduced to about 10%, i.e. the average induced penalty will be lower, compared to the case when spectrum dithering is not applied. An additional crosstalk can then be tolerated for the same amount of induced penalty. The amount of additional crosstalk that can be tolerated can therefore be considered as a gain, compared to the situation when dithering is not applied.

Figure 6A:
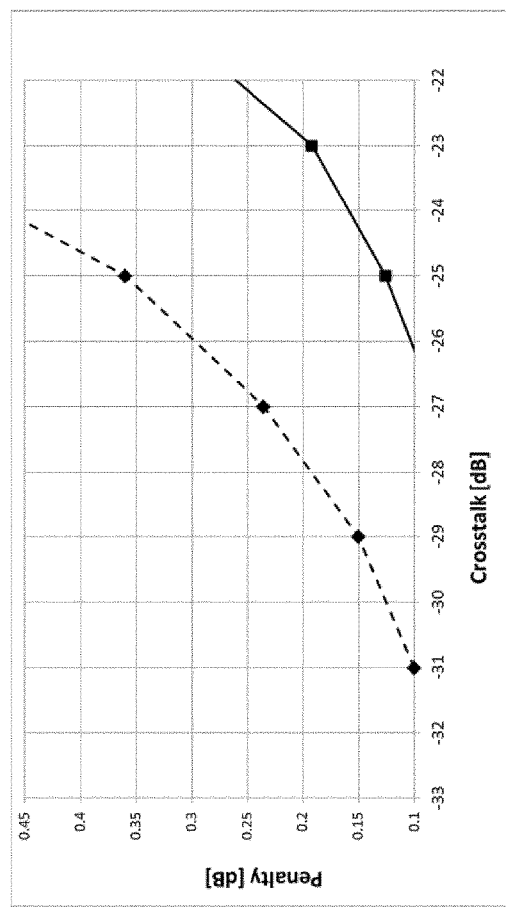
FIGS. 6a and 6b show graphs of a penalty produced by the activation signal on an upstream data signal, as a function of the crosstalk between the two signals.
Figure 6B:
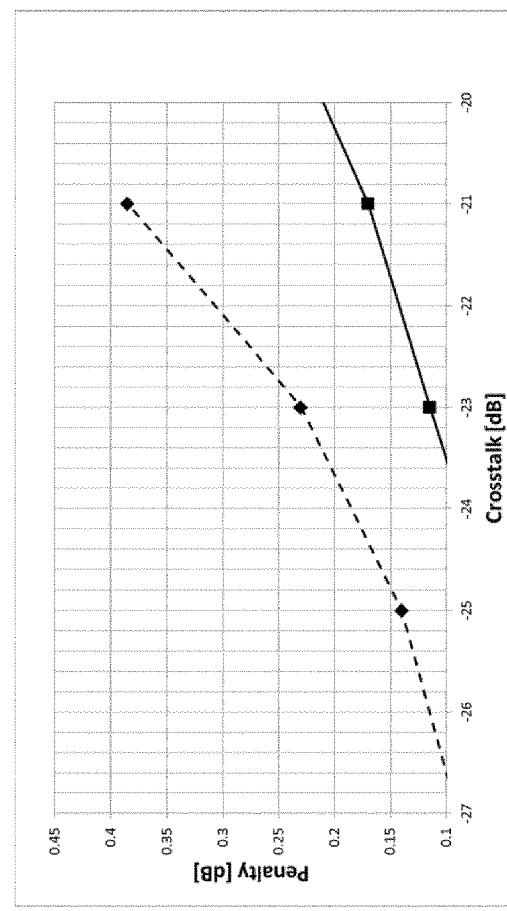

FIGS. 6a and 6b show graphs indicating the penalty on the upstream signal of an already active ONU as a function of the interferometric crosstalk induced by the low level, low frequency activation signal of an activating ONU, according to the first embodiment of this invention. In particular, the dashed curve indicates the penalty on the upstream signal of the already active ONU when the activating ONU 316 generates the activation signal AS using an optical transmitter directly modulated only by the first electric signal, i.e. when the low frequency dithering electric signal is absent. The solid curve indicates the penalty on the upstream signal of the already active ONU when the spectrum dithering is applied, i.e. when the low frequency dithering electric signal is present. The graphs of FIG. 6a are related to an exemplary situation according to which: a directly modulated transmitter 410 is used; the modulated signal and the dithering signal contribute to the modulation of the optical source 411, respectively, by 100% and 0% (dashed curve) or 70% and 30% (solid curve) of the total modulation depth; the first electric signal is a 2.5 MHz BPSK modulated signal; the second electric signal is a 1 kHz sinusoidal signal. In both cases, the upstream data signal has a 2.5 Gbps rate and 13 dB extinction ratio; the OLT receiver is based on a PIN diode and an average power decision threshold is used. As can be seen from the graphs of FIG. 6a, when a low frequency dithering signal directly modulates the optical source, in addition to the modulated signal, and produces the dithering of the activation signal spectrum, the penalty on the upstream signal of an already connected ONU is advantageously reduced. As an example, under the previous assumptions, using a low frequency dithering electric signal at 1 kHz for directly modulating the optical source allows reducing the crosstalk of about 3.5 dB for a given penalty of 0.2 dB with respect to the case in which no low frequency dithering signal is used. This means that the power of the low level, low frequency activation signal can be increased by the same amount, for the same level of allowable interferometric crosstalk penalty, thus making the detection of the activation signal at the OLT receiver more reliable.

The advantage when an externally modulated transmitter 420 is used according to the second embodiment of the present invention, is even higher, as evident from the graphs of FIG. 6b. The dashed line corresponds to the penalty in case the first electric signal (with carrier frequency equal to 2.5 MHz and BPSK modulation) is applied to the modulator 424 and the dithering electric signal is absent; the solid line corresponds to the penalty achieved in case, in addition to the modulated electric signal, the dithering electric signal (in the form of a sinusoidal wave at 1 kHz) directly modulates the optical source 421 with modulation index 6.7%. In both cases, the upstream data signal has a 2.5 Gbps rate and 13 dB extinction ratio; the OLT receiver is based on a PIN diode and an average power decision threshold is used. It is evident that in this case the crosstalk on the upstream signal of an already active ONU is advantageously reduced of about 5 dB, for a penalty of 0.2 dB, with respect to the case in which no low frequency dithering signal is used.

It is to be noticed that the frequency of the second electric signal directly modulating the optical source according to the present invention may also be higher than 10 kHz. Indeed, in case the upstream signal of an already connected ONU consists in short bursts of data, the interferometric crosstalk, which, as explained above, may be instantaneously high, may disadvantageously affect an entire burst of data. In this case, the frequency of the second electric signal is preferably chosen so that the shift of the optical carrier of the low level, low frequency activation signal caused by the chirping effect is faster then the time length of the shortest data burst of the upstream signal. This means that the frequency of the second electric signal is preferably chosen so that the period of this signal is shorter than the time length of the shortest data burst. For example, in NG-PON2 systems, the shortest data burst may be about 20 bytes long. Hence, the shortest data burst may be 64 ns long for a data rate of 2.5 Gbps and 16 ns long for a data rate of 10 Gbps. In this case, the frequency of the dithering signal is preferably higher than 15 MHz when operating at 2.5 Gbps and higher than 60 MHz when operating at 10 Gbps. This can be achieved in the first embodiment by directly using a carrier frequency of the first signal of respectively 15 MHz or 60 MHz, according to the examples above, with no need for a separate dithering electric signal. According to the second embodiment, instead, a dithering signal directly modulating the laser source is needed to produce the activation signal spectrum dithering. It is to be appreciated that, as known from Kobayashi S, et al: "Direct Frequency Modulation In AlGaAs Semiconductor Lasers", IEEE Journal of Quantum Electronics, vol. 18, no. 4, pp. 582-595, the deviation of the frequency of a laser is at its minimum for modulation frequencies higher than about 10 MHz. Typically, a deviation of about 0.1 GHz/mA can be appreciated. Therefore, when the frequency of the second electric signal is higher than a few MHz, a high amplitude of the dithering electric signal that modulates the optical source is preferably used in order to achieve a relevant chirping effect (or, equivalently, a high modulation index, close to 100%, is preferably used). The needed amplitude could then be several tens of mA to achieve several GHz of deviation, necessary to reduce the interferometric crosstalk. The inventors performed some tests showing that a total deviation of about +/−7.5 GHz can be obtained, for example, when the second electric signal has a frequency of 2.5 MHz and the modulation index is 100%, corresponding to a variation of the modulation current of +/−75 mA.

It is to be noted that, if the upstream data are protected by means of an error correction code (e.g. a FEC code), the frequency of the dithering signal can be reduced, as compared to the previous examples. The reason is that short bursts of upstream data are better protected (i.e. a higher level of interferometric crosstalk can be tolerated) by shortened versions of error correction codes that are typically used. A dithering signal frequency of few MHz may then be sufficient in this case.

It is also to be noted that a waveform of the dithering signal other than the sinusoidal one could be advantageously used. Indeed, the fraction of time during which the interferometric beating between the low level, low frequency activation signal and an upstream signal of an already active ONU occurs is large when beating occurs in correspondence of a peak of the sinusoidal signal, where the rate of change of the optical source wavelength caused by the chirping effect is quite slow. A triangular or sawtooth waveform could then be more preferably used.

Figure 2:
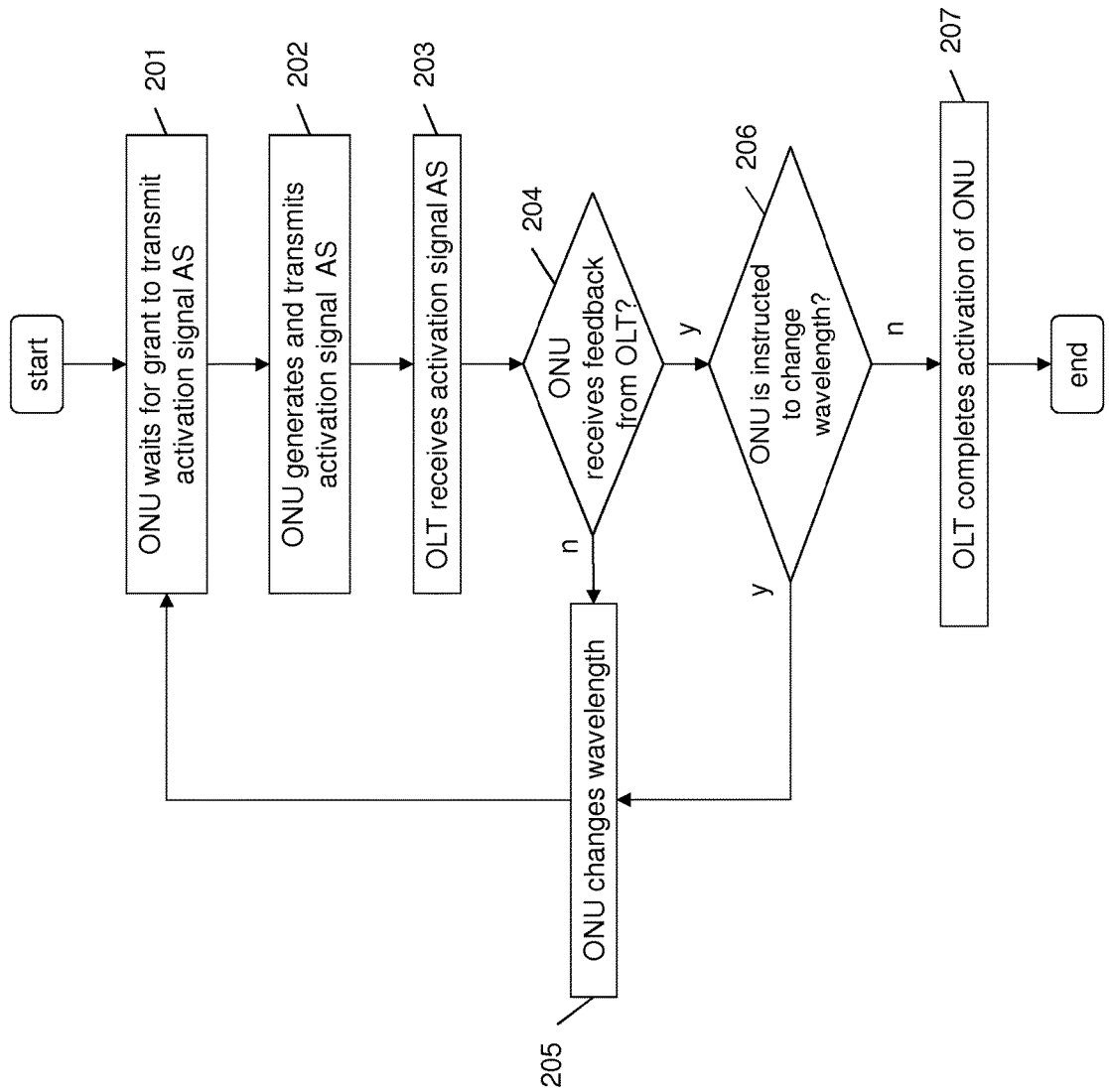
FIG. 2 is a schematic flow chart of the method for activating an ONU of the multi-wavelength PON network of FIG. 1, according to the present invention

With reference again to the flow chart of FIG. 2, according to embodiments of the present invention, at step 203 the OLT 100 receives the activation signal AS. As mentioned above, the wavelength of the activation signal AS may be anyone of the wavelengths at which the uncalibrated transmitter of the ONU 316 may be tuned. Hence, the wavelength of the activation signal AS may lie in any one of the upstream channels λu1, λu2, λu3, λu4. The wavelength of the activation signal AS may accordingly lie out of or within the receiver bandwidth of the channel termination responsible of managing the upstream channel λu2.

Then, if the wavelength of the activation signal AS lies within the receiver bandwidth of the channel termination responsible of managing the upstream channel λu2, the OLT 100 (namely its channel termination responsible of managing the upstream channel λu2) preferably detects the activation signal AS and sends a feedback signal to the ONU 316 to be activated (step not shown in the drawings). The OLT 100 may also detect that the wavelength of the activation signal AS does not lie within the receiver bandwidth of the channel termination responsible of managing the upstream channel λu2, and send a feedback signal to the ONU 316 to be activated containing a command instructing the ONU 316 to change wavelength.

The ONU 316 to be activated, on the other hand, is preferably configured to transmit the activation signal AS for a predefined period of time. If, upon expiration of such period of time, the ONU 316 does not receive any feedback signal from the channel termination which is responsible of managing the upstream channel λu2 at the OLT 100 ("n" branch of step 204), or, alternatively, receives a feedback signal containing a command instructing the ONU 316 to change wavelength ("y" branch of step 206), it determines that it is trying to activate on the wrong upstream channel (namely, the wavelength of the activation signal AS was lying in one of the upstream channels λu1, λu3, λu4, in-between two upstream channels or even outside the upstream wavelength range). Hence, the ONU 316 preferably changes its transmission wavelength (step 205) and tries to activate on a new wavelength. Steps 202, 203, 204, 205 and 206 are accordingly iterated, until the ONU 316 receives a feedback signal from the channel termination responsible of managing the upstream channel λu2 at the OLT 100 indicating that the ONU 316 transmission wavelength now lies within the receiver bandwidth of the channel termination responsible of managing the upstream channel λu2 at the OLT 100.

When the ONU 316 receives the feedback signal from the OLT 100 indicating that the ONU 316 transmission wavelength lies within the receiver bandwidth of the channel termination responsible of managing the upstream channel λu2 at the OLT 100, the ONU 316 is under the control of the OLT 100 (in particular, of the channel termination responsible of managing the upstream channel λu2), which preferably completes the activation of the ONU 316 (step 206). In particular, the OLT 100 preferably optimizes the wavelength tuning of the ONU 316 by sending it suitable wavelength tuning commands. At step 206, the OLT 100 may also calculate the distance of the ONU 316, e.g. by using the phase of the activation signal AS as mentioned above. Alternatively, the OLT 100 may carry out a known ranging procedure, by opening a quiet window on the upstream channel λu2 on which the ONU 316 is being activated. It shall be noticed that, since the transmitter of the ONU 316 is now calibrated on the upstream wavelength λu2, there is no longer a risk of collisions with upstream signals generated by the ONUs already active on the other upstream channels λu1, λu3 and λu4, even if the quiet windows on the various upstream channels are not synchronized and even if no quiet window is opened at all on the other channels.

The method for activating an ONU according to the embodiments of the present invention described above, has some advantages.

As already discussed above, directly modulating the optical source of the optical transmitter of the ONU with an electric signal (generated by the second electric source 413, 423 in the block schemes of FIGS. 3a and 3b) allows varying the injection current of the optical source and generating a spurious modulation of frequency and phase of the generated optical signal. This spurious modulation causes a dithering of the optical spectrum of the activation signal which results in reducing the interferometric crosstalk on the upstream signal of an already connected ONU. As shown above, this solution may be applied when the low frequency modulated signal directly modulates the optical source and especially when the low frequency modulated signal externally modulates the optical source. The spectrum dithering of the activation signal moves the beating between the low level, low frequency activation signal and the upstream signal of an already active ONU out of the bandwidth of the electric filter of the OLT receiver for most of the time, thereby reducing the interferometric crosstalk. In this way, the power of the low level, low frequency signal used for activating the ONU may be kept at a level which is reliably detectable by the OLT receiver, thus improving the OLT receiver performances.

The invention claimed is:

1. An optical transmitter for an optical network unit of a multi-wavelength passive optical network comprising an optical line termination and a number of further optical network units for transmitting upstream signals to said optical line termination on multiple upstream channels, said optical transmitter being configured to generate and transmit an optical activation signal carrying activation information to be transmitted from said optical network unit to said optical line termination on an upstream channel of said multiple upstream channels, said activation signal having an optical power lower than the optical power of each one of said upstream signals, said optical transmitter comprising an optical source and;
    a first electric source configured to modulate said optical source with a first electric signal carrying said activation information; and
    a second electric source configured to directly modulate said optical source with a second electric signal so as to produce a frequency chirp on said optical activation signal.

2. The optical transmitter according to claim 1, wherein said activation signal has a bitrate lower than a bitrate of each one of said upstream signals transmitted by said further optical network units on said multiple upstream channels.

3. The optical transmitter according to claim 1, wherein said first electric source is configured to directly modulate said optical source.

4. The optical transmitter according to claim 1, wherein it further comprises an optical attenuator configured to provide at the output of the optical transmitter said activation signal with said optical power lower than the optical power of each one of said upstream signals.

5. The optical transmitter according to claim 1, wherein it further comprises an optical modulator downstream said optical source and said first electric source is configured to externally modulate said optical source by feeding the first electric signal to the optical modulator.

6. The optical transmitter according to claim 1, wherein said first electric signal is a sinusoidal signal modulated by said activation information according to a binary phase shift keying modulation scheme.

7. The optical transmitter according to claim 1, wherein said first electric signal is a sinusoidal signal modulated by said activation information having a carrier frequency equal to 2.5 MHz.

8. The optical transmitter according to claim 1, wherein said second electric signal is one of a sinusoidal wave signal, a triangular wave signal or a sawtooth wave signal.

9. The optical transmitter according to claim 1, wherein said second electric signal has a frequency ranging between about 100 Hz and about 10 KHz.

10. An optical network unit for a multi-wavelength passive optical network comprising an optical line termination and a number of further optical network units for transmitting upstream signals to said optical line termination on multiple upstream channels, said optical network unit comprising an optical transmitter configured to generate and transmit an optical activation signal carrying activation information to be transmitted from said optical network unit to said optical line termination on an upstream channel of said multiple upstream channels, said activation signal having an optical power lower than the optical power of each one of said upstream signals, said optical transmitter comprising an optical source and:
    a first electric source configured to modulate said optical source with a first electric signal carrying said activation information; and
    a second electric source configured to directly modulate said optical source with a second electric signal so as to produce a frequency chirp on said optical activation signal.

11. A multi-wavelength passive optical network comprising:
    an optical line termination;
    an optical network unit to be activated on an upstream channel of said multi-wavelength passive optical network; and
    a number of further optical network units configured to transmit upstream signals to said optical line termination on multiple upstream channels including said upstream channel,
    wherein said optical network unit comprises an optical transmitter configured to generate and transmit an optical activation signal carrying activation information to be transmitted from said optical network unit to said optical line termination on an upstream channel of said multiple upstream channels, said activation signal having an optical power lower than the optical power of each one of said upstream signals, said optical transmitter comprising an optical source and;
    a first electric source configured to modulate said optical source with a first electric signal carrying said activation information; and
    a second electric source configured to directly modulate said optical source with a second electric signal so as to produce a frequency chirp on said optical activation signal.

12. A method for activating an optical network unit on an upstream channel of a multi-wavelength passive optical network, said multi-wavelength passive optical network comprising an optical line termination and a number of further optical network units for transmitting upstream signals to said optical line termination on multiple upstream channels including said upstream channel, said method comprising generating an optical activation signal carrying activation information to be transmitted from said optical network unit to said optical line termination on an upstream channel of said multiple upstream channels, said activation signal having an optical power lower than the optical power of each one of said upstream signals, said generating an optical activation signal comprising:
    a) modulating an optical source with a first electric signal carrying said activation information;
    b) directly modulating said optical source with a second electric signal so as to produce a frequency chirp on said optical activation signal; and
    c) transmitting said optical activation signal to said optical line termination.

13. The method according to claim 12, wherein at step a) said modulating comprises directly modulating said optical source or externally modulating said optical source by feeding the first electric signal to an optical modulator downstream said optical source.

14. The method according to claim 12, further comprising detecting said activation signal at said optical line termination if said activation signal is transmitted on said upstream channel and sending a feedback signal from said optical line termination to said optical network unit.

15. The method according to claim 14, wherein said step c) comprises transmitting said activation signal in a substantially continuous way until a predefined time has expired or until said feedback signal is received at said optical network unit.

* * * * *